United States Patent
Volpi et al.

(10) Patent No.: US 12,361,694 B2
(45) Date of Patent: Jul. 15, 2025

(54) RESET SYSTEMS AND METHODS FOR CONTINUOUS ADAPTATION WITHOUT FORGETTING

(71) Applicant: NAVER CORPORATION, Gyeonggi-do (KR)

(72) Inventors: Riccardo Volpi, Grenoble (FR); Diane Larlus, La Tronche (FR); Gabriela Csurka Khedari, Crolles (FR)

(73) Assignee: NAVER CORPORATION, Gyeonggi-Do (KR)

( * ) Notice: Subject to any disclaimer, the term of this patent is extended or adjusted under 35 U.S.C. 154(b) by 764 days.

(21) Appl. No.: 17/588,855

(22) Filed: Jan. 31, 2022

(65) Prior Publication Data

US 2023/0245436 A1    Aug. 3, 2023

(51) Int. Cl.
*G06V 10/82* (2022.01)
*G06N 3/08* (2023.01)
*G06T 7/20* (2017.01)

(52) U.S. Cl.
CPC ............ *G06V 10/82* (2022.01); *G06N 3/08* (2013.01); *G06T 7/20* (2013.01)

(58) Field of Classification Search
CPC ...... G06V 10/82; G06V 10/764; G06V 20/56; G06N 3/08; G06N 3/045; G06T 7/20
See application file for complete search history.

(56) References Cited

U.S. PATENT DOCUMENTS

| | | | |
|---|---|---|---|
| 10,176,388 B1 * | 1/2019 | Ghafarianzadeh | G06V 10/94 |
| 2020/0082219 A1 * | 3/2020 | Li | G01S 7/417 |

(Continued)

FOREIGN PATENT DOCUMENTS

| | | | |
|---|---|---|---|
| CN | 116050352 A | * | 5/2023 |
| CN | 117437411 A | * | 1/2024 |

(Continued)

OTHER PUBLICATIONS

Chen, Liang-Chieh, George Papandreou, Iasonas Kokkinos, Kevin Murphy, and Alan L. Yuille. "DeepLab: Semantic Image Segmentation with Deep Convolutional Nets, Atrous Convolution, and Fully Connected CRFs." *IEEE Transactions on Pattern Analysis and Machine Intelligence* 40, No. 4: 834-48, 2018.

(Continued)

*Primary Examiner* — Pinalben Patel

(57) ABSTRACT

An autonomous system includes: a first semantic segmentation model trained based on a training dataset including images and labels for the images, the first semantic segmentation model configured to generate a first segmentation map based on an image from a camera; a second semantic segmentation model of the same type of semantic segmentation model as the first semantic segmentation model, the second semantic segmentation model configured to generate a second segmentation map based on the image from the camera; an adaptation module configured to selectively adjust one or more first parameters of the second semantic segmentation model; and a reset module configured to: determine a first total number of unique classifications included in the first segmentation map; determine a second total number of unique classifications included in the first segmentation map; and selectively reset the first parameters to previous parameters, respectively, based on the first and second total numbers.

24 Claims, 6 Drawing Sheets

(56) References Cited

U.S. PATENT DOCUMENTS

| | | | |
|---|---|---|---|
| 2023/0186100 A1* | 6/2023 | Nugteren | G06F 18/24143 382/155 |
| 2024/0119697 A1* | 4/2024 | Duckworth | G06V 10/778 |

FOREIGN PATENT DOCUMENTS

| | | | |
|---|---|---|---|
| CN | 118298181 A | * | 7/2024 |
| CN | 118866332 A | * | 10/2024 |

OTHER PUBLICATIONS

Hayes, Tyler L., Nathan D. Cahill, and Christopher Kanan. "Memory Efficient Experience Replay for Streaming Learning." In *2019 International Conference on Robotics and Automation (ICRA)*, 2019.

Hayes, Tyler L., Kushal Kafle, Robik Shrestha, Manoj Acharya, and Christopher Kanan. "Remind Your Neural Network to Prevent Catastrophic Forgetting." In *ECCV 2020*.

Hayes, Tyler L., and Christopher Kanan. "Lifelong Machine Learning with Deep Streaming Linear Discriminant Analysis." In *2020 IEEE/CVF Conference on Computer Vision and Pattern Recognition Workshops (CVPRW)*, 2020.

Lee, Dong-Hyun. "Pseudo-Label ?: The Simple and Efficient Semi-Supervised Learning Method for Deep Neural Networks," In ICML, 2013.

Parisi, G., Kemker, R., Part, J., Kanan, C., and Wermter, S. "Continual Lifelong Learning with Neural Networks: A Review" Neural Networks, 2019.

Richter, Stephan R., Vibhav Vineet, Stefan Roth, and Vladlen Koltun. "Playing for Data: Ground Truth from Computer Games." In *ECCV*, 2016.

Ros, German, Laura Sellart, Joanna Materzynska, David Vazquez, and Antonio M. Lopez. "The Synthia Dataset: A Large Collection of Synthetic Images for Semantic Segmentation of Urban Scenes." In *IEEE Conference on Computer Vision and Pattern Recognition (CVPR)*, Las Vegas, NV, USA, 2016.

Sakaridis, Christos, Dengxin Dai, and Luc Van Gool. "ACDC: The Adverse Conditions Dataset with Correspondences for Semantic Driving Scene Understanding." ArXiv:2104.13395 [CS], Sep. 1, 2021.

Schneider, Steffen, Oliver Bringmann, Evgenia Rusak, Wieland Brendel, Luisa Eck, and Matthias Bethge. "Improving Robustness against Common Corruptions by Covariate Shift Adaptation," in NeurIPS, 2020.

Sun, Yu, Xiaolong Wang, Zhuang Liu, John Miller, Alexei a Efros, and Moritz Hardt. "Test-Time Training with Self-Supervision for Generalization under Distribution Shifts," in ICML, 2020.

Wang, Dequan, Evan Shelhamer, Shaoteng Liu, Bruno Olshausen, and Trevor Darrell. "Tent: Fully Test-Time Adaptation by Entropy Minimization," ICLR, 2021.

Zhang, Marvin, Sergey Levine, and Chelsea Finn. "MEMO: Test Time Robustness via Adaptation and Augmentation." ArXiv:2110.09506 [CS], Jan. 24, 2022.

* cited by examiner

RESET SYSTEMS AND METHODS FOR CONTINUOUS ADAPTATION WITHOUT FORGETTING

FIELD

The present disclosure relates to systems and methods for adaptation of models after training and, more particularly, to systems and methods for resetting models to avoid forgetting previously learned information.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots is an example of an autonomous system that is mobile and may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants/humans from a pickup to a destination. Another example of a navigating robot is a robot used to perform one or more functions inside a residential space (e.g., a home).

Other types of robots are also available, such as residential robots configured to perform various domestic tasks, such as putting liquid in a cup, filling a coffee machine, etc.

SUMMARY

In a feature, an autonomous system includes: a first semantic segmentation model trained based on a training dataset including images and labels for the images, the first semantic segmentation model configured to generate a first segmentation map based on an image from a camera of the autonomous system; a second semantic segmentation model of the same type of semantic segmentation model as the first semantic segmentation model, the second semantic segmentation model configured to generate a second segmentation map based on the image from the camera of the autonomous system; an adaptation module configured to selectively adjust one or more first parameters of the second semantic segmentation model; and a reset module configured to: determine a first total number of unique classifications included in the first segmentation map; determine a second total number of unique classifications included in the first segmentation map; and selectively reset the first parameters of the second semantic segmentation model to previous parameters, respectively, based on the first and second total numbers of unique classifications.

In further features, the reset module is configured to reset the first parameters of the second semantic segmentation model to the previous parameters, respectively, when a difference between the first and second total numbers of unique classifications is greater than a predetermined value.

In further features, the first parameters of the second semantic segmentation model are initialized to second parameters of the first semantic segmentation model, respectively.

In further features, the previous parameters are second parameters of the first semantic segmentation model, respectively.

In further features, the second parameters of the first semantic segmentation model are not changed after the training.

In further features, the adaptation module is configured to selectively adjust one or more of the first parameters of the second semantic segmentation model based on at least one of: (a) the image and (b) the second segmentation map.

In further features, the first and second semantic segmentation models each include a DeepLab model.

In further features, the reset module is further configured to: determine first weights of a portion of the first semantic segmentation model; determine second weights of the portion of the second semantic segmentation model; and selectively reset the first parameters of the second semantic segmentation model to the previous parameters, respectively, based on a comparison of one of the first weights with a respective one of the second weights.

In further features, the reset module is configured to reset the first parameters of the second semantic segmentation model to the previous parameters, respectively, when a difference between (a) the one of the first weights and (b) the respective one of the second weights is greater than a predetermined value.

In further features, the portion of the first and second semantic segmentation models is a final layer of a decoder of the first and second semantic segmentation models.

In further features, the previous parameters include previous parameters, respectively, of the second semantic segmentation model.

In further features, a control module is configured to selectively actuate an actuator of the autonomous system based on the second segmentation map.

In a feature, an autonomous system includes: a first semantic segmentation model trained based on a training dataset including images and labels for the images, the first semantic segmentation model configured to generate a first segmentation map based on an image from a camera of the autonomous system; a second semantic segmentation model of the same type of semantic segmentation model as the first semantic segmentation model, the second semantic segmentation model configured to generate a second segmentation map based on the image from the camera of the autonomous system; an adaptation module configured to selectively adjust one or more first parameters of the second semantic segmentation model; and a reset module configured to: determine first weights of a portion of the first semantic segmentation model; determine second weights of the portion of the second semantic segmentation model; and selectively reset the first parameters of the second semantic segmentation model to previous parameters, respectively, based on a comparison of one of the first weights with a respective one of the second weights.

In further features, the reset module is configured to reset the first parameters of the second semantic segmentation model to the previous parameters, respectively, when a difference between (a) the one of the first weights and (b) the respective one of the second weights is greater than a predetermined value.

In further features, the previous parameters include previous parameters, respectively, of the second semantic segmentation model.

In further features, the first parameters of the second semantic segmentation model are initialized to second parameters of the first semantic segmentation model, respectively.

In further features, the previous parameters are second parameters of the first semantic segmentation model, respectively.

In further features, the adaptation module is configured to selectively adjust one or more of the first parameters of the second semantic segmentation model based on at least one of: (a) the image and (b) the second segmentation map.

In further features, a control module is configured to selectively actuate an actuator of the autonomous system based on the second segmentation map.

In a feature, an autonomous system includes: a first model trained based on a training dataset including images and labels for the images, the first model configured to generate a first output based on an image from a camera of the autonomous system; a second model of the same type of model as the first model, the second model configured to generate a second output based on the image from the camera of the autonomous system; an adaptation module configured to selectively adjust one or more first parameters of the second model; and a reset module configured to: determine first weights of a portion of the first model; determine second weights of the portion of the second model; and selectively reset the first parameters of the second model to previous parameters, respectively, based on a comparison of one of the first weights with a respective one of the second weights.

In a feature, an autonomous system includes: a camera configured to record input images; a sensor module configured to detect one or more environmental changes external to the autonomous system; a segmentation module configured to receive the input images from the camera and to segment objects in the input images using a neural network model; an adaptation module configured to selectively adjust one or more parameters of the neural network model utilized by the segmentation module from an input set of parameters to define an adapted set of parameters; the input set of parameters being defined by an initial set or parameters or a previously adapted set of parameters; the initial set of parameters of the neural network model being trained on a dataset including images and labels for the images; memory configured to store a plurality of parameter checkpoints of the neural network model; the initial set of parameters and each adapted set of parameters stored in the memory defining a different parameter checkpoint; each parameter checkpoint being associated with a different set of parameters of a semantic segmentation model; and a reset module configured to selectively reset the neural network model utilized to a parameter checkpoint stored in the memory when the reset module detects the parameters of the neural network model selectively adjusted by the adaptation module to be utilized by the segmentation module exceed a criteria dynamically determined by the reset module.

In further features, the criteria determined by the reset module is based on in whole or in part on one or more environmental changes detected by the sensor module.

In further features, the parameter checkpoint selected by the reset module to replace the neural network model selectively adjusted by the adaptation module is determined based in whole or in part on the one or more environmental changes detected by the environment sensor.

In further features, the sensor module includes one or more of a location sensor, a temperature sensor, a water sensor and a light sensor.

In a feature, a method includes: by a first semantic segmentation model trained based on a training dataset including images and labels for the images, generating a first segmentation map based on an image from a camera; by a second semantic segmentation model of the same type of semantic segmentation model as the first semantic segmentation model, generating a second segmentation map based on the image from the camera; selectively adjusting one or more first parameters of the second semantic segmentation model; determining a first total number of unique classifications included in the first segmentation map; determining a second total number of unique classifications included in the first segmentation map; and selectively resetting the first parameters of the second semantic segmentation model to previous parameters, respectively, based on the first and second total numbers of unique classifications.

In a feature, a method includes: by a first semantic segmentation model trained based on a training dataset including images and labels for the images, generating a first segmentation map based on an image from a camera; by a second semantic segmentation model of the same type of semantic segmentation model as the first semantic segmentation model, generating a second segmentation map based on the image from the camera; selectively adjusting one or more first parameters of the second semantic segmentation model; determining first weights of a portion of the first semantic segmentation model; determining second weights of the portion of the second semantic segmentation model; and selectively resetting the first parameters of the second semantic segmentation model to previous parameters, respectively, based on a comparison of one of the first weights with a respective one of the second weights.

In a feature, a method includes: by a first model trained based on a training dataset including images and labels for the images, generating a first output based on an image from a camera; by a second model of the same type of model as the first model, generating a second output based on the image from the camera; selectively adjusting one or more first parameters of the second model; determining first weights of a portion of the first model; determining second weights of the portion of the second model; and selectively resetting the first parameters of the second model to previous parameters, respectively, based on a comparison of one of the first weights with a respective one of the second weights.

In a feature, a method includes: by a camera, recording input images; detecting one or more environmental external changes; receiving the input images from the camera; segmenting objects in the input images using a neural network model; selectively adjusting one or more parameters of the neural network model utilized by the segmentation module from an input set of parameters to define an adapted set of parameters, the input set of parameters being defined by an initial set or parameters or a previously adapted set of parameters, the initial set of parameters of the neural network model being trained on a dataset including images and labels for the images; storing a plurality of parameter checkpoints of the neural network model, the initial set of parameters and each adapted set of parameters stored in the memory defining a different parameter checkpoint, each parameter checkpoint being associated with a different set of parameters of a semantic segmentation model; and selectively resetting the neural network model utilized to a parameter checkpoint stored in the memory when a detection occurs of the parameters of the neural network model selectively adjusted by the adaptation module to be utilized by the segmentation module exceed a criteria dynamically determined.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A robot is an example of an autonomous system in which the present disclosure may be embodied. Alternate autonomous systems in which the present disclosure may be embodied include self-driving vehicles, self-flying drones, and other self-piloted apparatus (e.g., submarines, boats, etc.). For the purpose of this disclosure a robot will be used as an example embodiment of an autonomous system incorporating the features of the apparatuses and methods described in this application. The features of the disclosed robot may be extended and/or adapted for other autonomous systems.

A robot may include a camera. Images from the camera can be used to control actuation of the robot, such as propulsion, actuation of one or more arms, or actuation of an end effector. For example, a semantic segmentation model can generate a segmentation map based on an image, and a control module can control actuation of the robot based on the segmentation map.

Prior to use in the robot, the semantic segmentation model may be trained using training images with labels (e.g., pixel level annotations). In use, however, the images from the camera do not include labels.

An adaptation module can be implemented to adapt one or more parameters of the semantic segmentation model over time. However, the images from the camera being different than the training dataset may cause the semantic segmentation model to, based on the adaptation, forget how to classify objects in the training dataset.

The present application involves selectively resetting parameters of the semantic segmentation model to avoid forgetting. A resetting module may reset the semantic segmentation model, for example, when a number of classes predicted in a segmentation map generated by the originally trained model based on an image is different than a number of classes predicted in a segmentation map generated by the adapted semantic segmentation model by at least a predetermined value. Additionally or alternatively, the resetting module may reset the semantic segmentation model when a weight of a portion of the originally trained model are different than a respective weight of a portion of the adapted semantic segmentation model by a predetermined value. This resets to the original training and avoids use of an adapted model that has drifted too far from the training and forgot at least some knowledge gained from the training.

Figure 1:
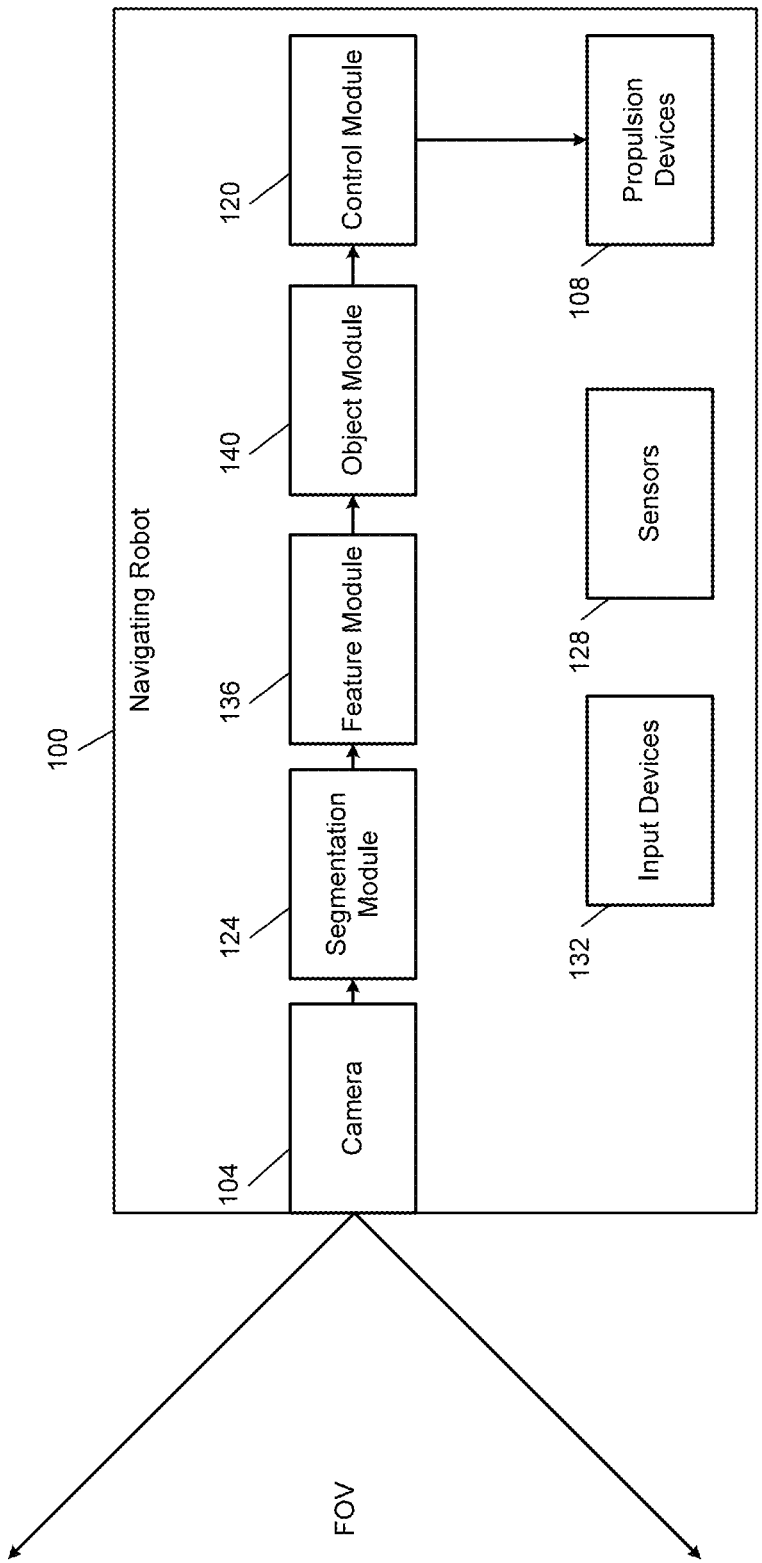
FIGS. 1 and 2 are functional block diagrams of example robots.

FIG. 1 is a functional block diagram of an example implementation of a navigating robot 100. The navigating robot 100 is a vehicle. The navigating robot 100 includes a camera 104 that captures images within a predetermined field of view (FOV). The predetermined FOV may be less than or equal to 360 degrees around the navigating robot 100. The operating environment of the navigating robot 100 may be an indoor space (e.g., a building), an outdoor space, or both indoor and outdoor spaces.

The camera 104 may be, for example, a grayscale camera, a red, green, blue (RGB) camera, or another suitable type of camera. The camera 104 may or may not capture depth (D) information, such as in the example of a grayscale-D camera or a RGB-D camera. The camera 104 may be fixed to the navigating robot 100 such that the orientation of the camera 104 (and the FOV) relative to the navigating robot 100 remains constant. The camera 104 may update (capture images) at a predetermined frequency, such as 60 hertz (Hz), 120 Hz, or another suitable frequency.

The navigating robot 100 may include one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly. The robot 100 is powered, such as via an internal battery and/or via an external power source, such as wirelessly, such as inductively.

While the example of a navigating robot is provided, the present application is also applicable to other types of robots with a camera.

Figure 2:
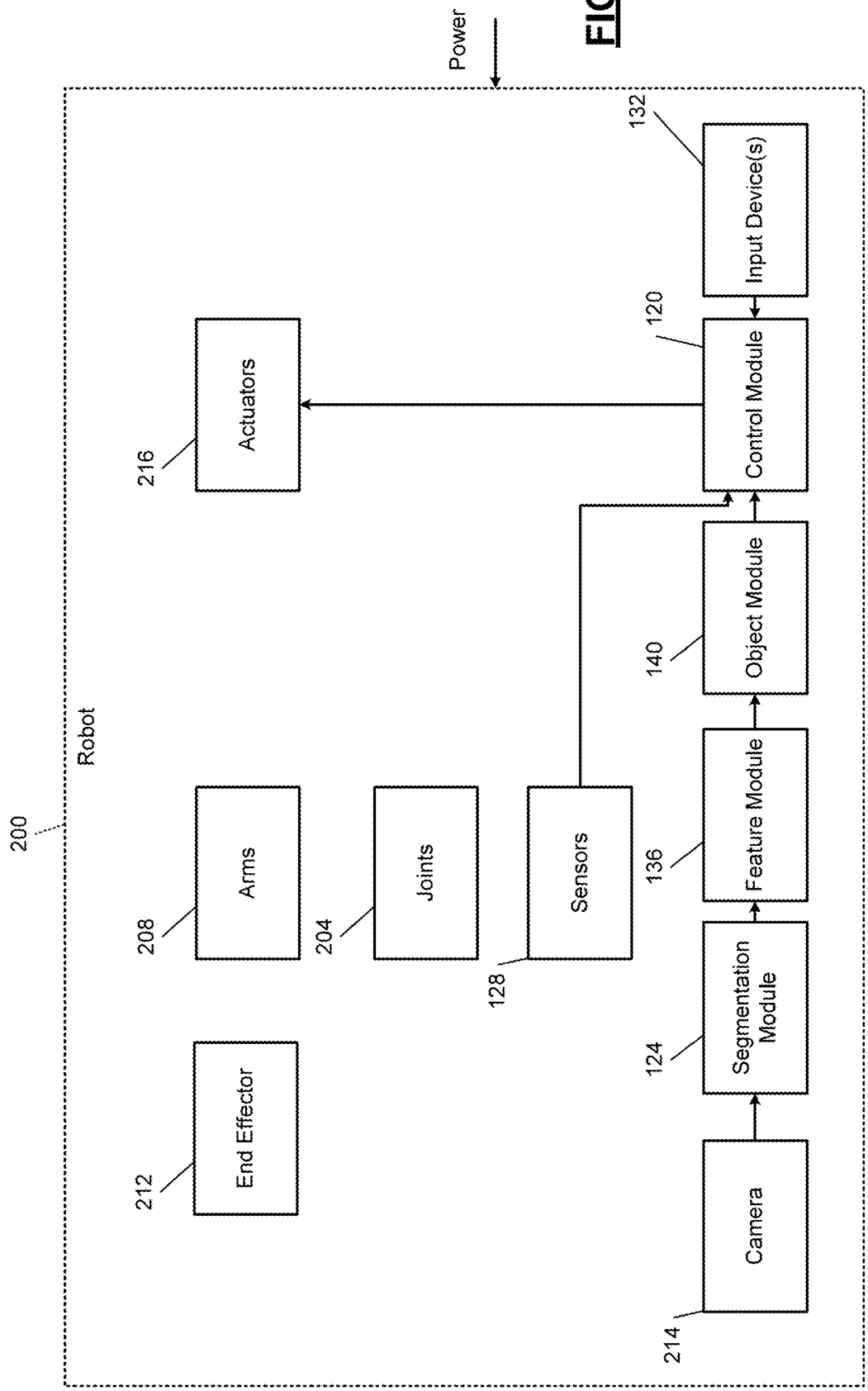

For example, FIG. 2 includes a functional block diagram of an example robot 200. The robot 200 may be stationary or mobile. The robot 200 may be, for example, a 5 degree of freedom (DoF) robot, a 6 DoF robot, a 7 DoF robot, an 8 DoF robot, or have another number of degrees of freedom. In various implementations, the robot 200 may be the Panda Robotic Arm by Franka Emika, the mini Cheetah robot, or another suitable type of robot.

The robot 200 is powered, such as via an internal battery and/or via an external power source, such as alternating current (AC) power. AC power may be received via an outlet, a direct connection, etc. In various implementations, the robot 200 may receive power wirelessly, such as inductively.

The robot 200 includes a plurality of joints 204 and arms 208. Each arm may be connected between two joints. Each joint may introduce a degree of freedom of movement of an end effector 212 of the robot 200. The end effector 212 may be, for example, a gripper, a cutter, a roller, or another suitable type of end effector. The robot 200 includes actuators 216 that actuate the arms 208 and the end effector 212. The actuators 216 may include, for example, electric motors and other types of actuation devices.

In the example of FIG. 1, a control module 120 controls actuation of the propulsion devices 108. In the example of FIG. 2, the control module 120 controls the actuators 216 and therefore the actuation (movement, articulation, actuation of the end effector, etc.) of the robot 200. The control module 120 may include a planner module configured to plan movement of the robot 200 to perform one or more different tasks. An example of a task includes grasping and moving an object. The present application, however, is also applicable to other tasks. The control module 120 may, for example, control the application of power to the actuators 216 to control actuation. Actuation of the actuators 216, actuation of the end effector 212, and actuation of the propulsion devices 108 will generally be referred to as actuation of the robot.

The robot 200 also includes a camera 214 that captures images within a predetermined field of view (FOV). The predetermined FOV may be less than or equal to 360 degrees around the robot 200. The operating environment of the robot 200 may be an indoor space (e.g., a building), an outdoor space, or both indoor and outdoor spaces.

The camera 214 may be, for example, a grayscale camera, a red, green, blue (RGB) camera, or another suitable type of camera. The camera 214 may or may not capture depth (D) information, such as in the example of a grayscale-D camera or a RGB-D camera. The camera 214 may be fixed to the robot 200 such that the orientation of the camera 214 (and the FOV) relative to the robot 200 remains constant. The camera 214 may update (capture images) at a predetermined frequency, such as 60 hertz (Hz), 120 Hz, or another suitable frequency.

A segmentation module 124 generates a segmentation map based on an image using a semantic (image) segmentation model. For example only, the segmentation module 124 may generate a segmentation map using the DeepLab model or another suitable type of deep semantic segmentation model including visual transformer based models. The DeepLab model, which assigns semantic labels to image pixels, includes a ResNet-50 model as a feature extractor and a decoder. The segmentation module 124 generates a segmentation map for each image from the camera. Each segmentation map includes an integer for each pixel that indicates a most probable classification (e.g., 1=sidewalk, 2=building, 3=wall, etc.) for that pixel. Other example classifications include fence, pole, light, sign, vegetation, terrain, sky, human, rider, car, truck, bus, train, motorcycle, bicycle, etc. The robot 100 may have different classifications than the robot 200 and other types of robots.

The control module 120 controls actuation based on the segmentation maps of the images. The control module 120 may control actuation additionally or alternatively based on measurements from one or more sensors 128 and/or one or more input devices 132. Examples of sensors include position sensors, temperature sensors, location sensors, light sensors, rain sensors, force sensors, torque sensors, etc. Examples of input devices include touchscreen displays, joysticks, trackballs, pointer devices (e.g., mouse), keyboards, steering wheels, pedals, and/or one or more other suitable types of input devices.

A feature module 136 may identify features (visual features) in the images using the segmentation maps. For example, the feature module 136 may identify features based on patterns of classifications of pixels. An object module 140 identifies objects in the images based on the feature vector representations.

A control module 120 may be configured to control actuation, such as from a starting location to a goal location, based on the segmentation map, the features, the objects, etc. For example, the control module 120 may determine an action to be taken by the navigating robot 100. For example, the control module 120 may actuate the propulsion devices 108 to move the navigating robot 100 forward by a predetermined distance under some circumstances based on one or more features and/or one or more objects. The control module 120 may actuate the propulsion devices 108 to move the navigating robot 100 backward by a predetermined distance under some circumstances based on one or more features and/or one or more objects. The control module 120 may actuate the propulsion devices 108 to turn the navigating robot 100 to the right by the predetermined angle under some circumstances based on one or more features and/or one or more objects. The control module 120 may actuate the propulsion devices 108 to turn the navigating robot 100 to the left by the predetermined angle under some circumstances based on one or more features and/or one or more objects. The control module 120 may not actuate the propulsion devices 108 to not move the navigating robot 100 under some circumstances based on one or more features and/or one or more objects. The control module 120 may actuate the propulsion devices 108 to move the navigating robot 100 upward under some circumstances based on one or more features and/or one or more objects. The control module 120 may actuate the propulsion devices 108 to move the navigating robot 100 downward under some circumstances based on one or more features and/or one or more objects.

Before use in controlling actuation, the semantic segmentation model is trained based on a training dataset. The segmentation module 124 adapts the semantic segmentation model after training based on the (unlabeled) images from the camera.

The images captured by the camera, however, may significantly vary from the training dataset and cause significant variation of parameters of the semantic segmentation model relative to the parameters after training. This may cause the semantic segmentation model to forget learned information and the semantic segmentation model may be less likely to be able to accurately generate segmentation maps.

The present application involves detecting significant changes in the semantic segmentation model over time and selectively resetting the parameters of the semantic segmentation model to the original set of parameters (i.e., an initial set—initially trained before adaptation) or a previous set of the parameters (i.e., an intermediate set—adapted based on the original set of parameters or an intermediate set of parameters). Each set of saved parameters establishes a different parameter checkpoint.

Figure 3:
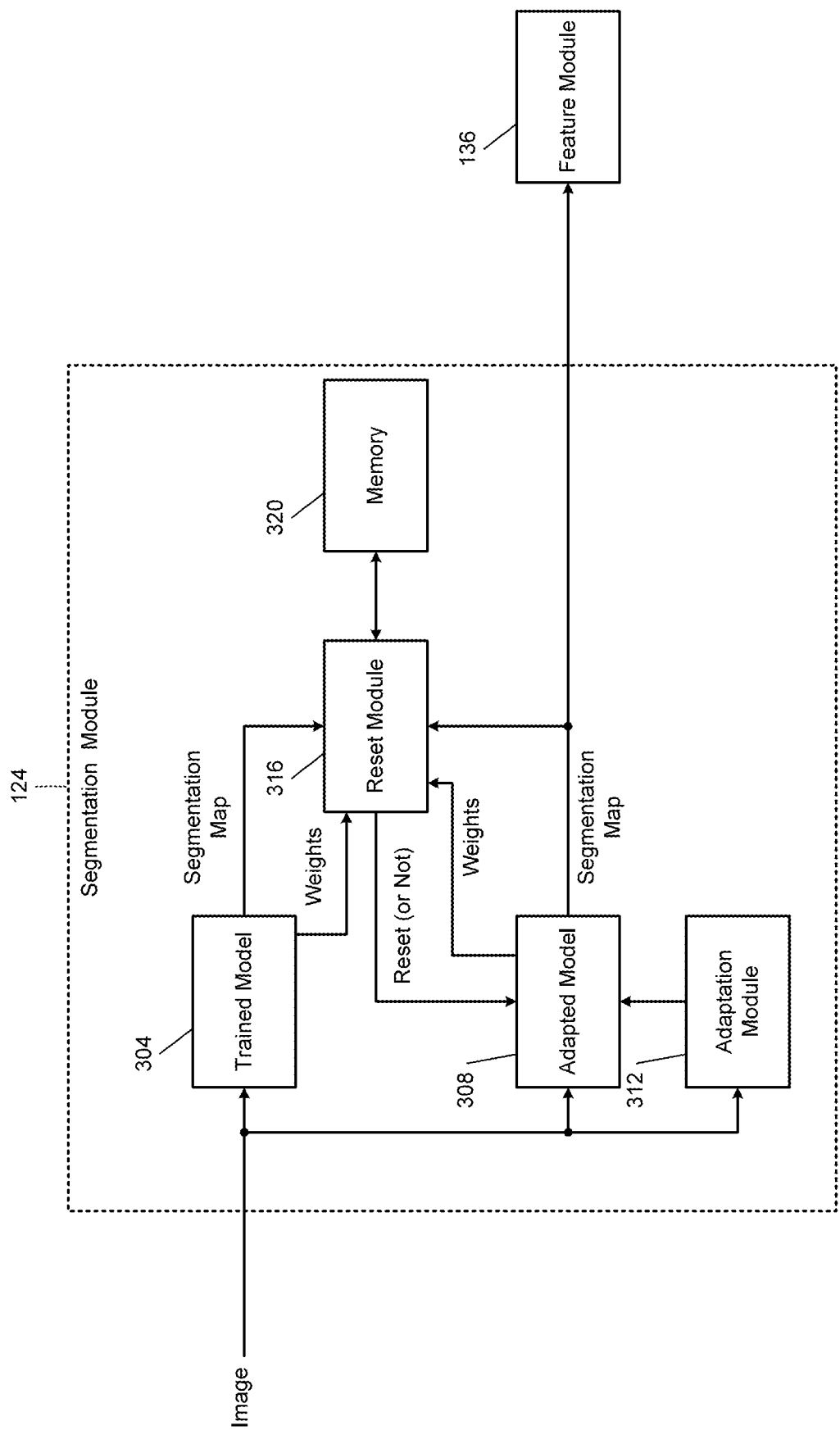
FIG. 3 is a functional block diagram of an example segmentation module.

FIG. 3 is a functional block diagram of an example implementation of the segmentation module 124. The segmentation module 124 includes a trained (first) semantic segmentation model 304 that generates segmentation maps for received images, respectively. The trained semantic segmentation model 304 may include, for example, the DeepLab model or another suitable semantic image segmentation model configured to generate segmentation maps based on received images, respectively. The DeepLab model is described in Chen et al., Deeplab: Semantic Image Segmentation with Deep Convolutional Nets, Atrous Convolution, and Fully Connected CRFs; IEEE Transactions on Pattern Analysis and Machine Intelligence (PAMI), 2017, 40(4):834-848. 5,7, which is incorporated herein in its entirety. The parameters of the trained semantic segmentation model 304 are trained using a training dataset and are kept constant after the training.

The segmentation module 124 also includes an adapted (second) semantic segmentation model 308 that generates segmentation maps for received images, respectively. The adapted semantic segmentation model 308 may include, for example, the ResNet-50 model or another suitable convolutional neural network configured to generate segmentation maps based on received images, respectively. The adapted semantic segmentation model 308 includes the same type of model as the trained model 304. The segmentation module 124 initializes/sets (e.g., when the robot is first powered on after training) the parameters of the adapted semantic segmentation model 308 to the parameters of the trained semantic segmentation model 304, respectively.

The adapted and trained semantic segmentation modules receive input images $x \in \mathcal{R}^{3 \times W \times H}$ and generate the segmentation maps $s \in \mathcal{R}^{C \times W \times H}$ based thereon, where C is the number of semantic classes that the models can recognize, and (W,H) denotes the size (width, height in pixels) of the image.

After initialization of the parameters of the adapted semantic segmentation model 308, however, an adaptation module 312 selectively adjusts one or more parameters of the adapted semantic segmentation model 308. The adaptation module 312 may selectively adjust one or more parameters of the adapted semantic segmentation model 308, for example, based on at least one of (a) one or more images and (b) one or more segmentation maps generated by the adapted semantic segmentation model 308.

The adaptation is unsupervised meaning using unlabeled images. During the training of the trained semantic segmentation model 304, labeled samples from a source distribution are used to train the semantic segmentation model 304. A goal of the adaptation may be to successfully process data samples from a target distribution of interest $P_T$ without labels for the data samples in the target domain/distribution. This may be formalized by a set of labeled samples from a source distribution $X_S = \{(x_i, y_i)\}_{i=1}^{M} \sim P_S$ and a set of unlabeled samples from the target distribution $X_T = \{x_i\}_{i=1}^{M} \sim P_T$. A goal of the adaptation may be to transfer discriminative knowledge that can be learned from the labelled training samples to the target domain.

At each time step t, the models receive an unlabeled image $x_t$. The trained and adapted semantic segmentation models $M_\theta$ each generate a segmentation map $\hat{s} = M_{\theta t}(x)$ based on the image. The adaptation module 312 (A) selectively updates one or more parameters of the adapted semantic segmentation model 308 $M_{\theta t} := M_{\theta t+1}$.

A reset module 316 selectively resets the parameters of the adapted semantic segmentation model 308 to a parameter checkpoint stored in memory 320 to one of: (a) the original (i.e., initial) set of parameters of the trained model 304, and (b) a previous (i.e., intermediate) set of parameters of the adapted semantic segmentation model 308. Establishing parameter checkpoints for intermediate sets of parameters is discussed further below.

In an example embodiment, which may be referred to as class reset, the reset module 316 may determine a first total number of classifications in a segmentation map generated by the trained semantic segmentation model 304 based on an image and a second total number of classifications in a segmentation map generated by the adapted semantic segmentation model 308 based on that image. The total number of classifications in a segmentation map is a total number of different values (e.g., 1, 2, 5, 6, 7, etc.) for different classifications in that segmentation map. The reset module 316 may count the number of different integers in each of the segmentation maps to determine the first and second total numbers of classifications. The reset module 316 may reset the parameters of the adapted semantic segmentation model 308 when a difference (subtraction) between (e.g., magnitudes of) the first and second total numbers is greater than a predetermined value. The predetermined value may be calibrated and may be, for example, 3, 4, 5, or another suitable number, such as to prevent over adaptation of the adapted semantic segmentation model 308 away from the training dataset.

To formalize, let $\mathcal{N}$ be an operator that receives a segmentation map and returns the total number of categories in the segmentation map. The operator $\mathcal{N}$ is applied to both segmentation maps. The reset strategy can be written as $$\mathcal{L} := \|\Sigma_{i=t-K}^{t} \mathcal{N}(M_{\theta t}(x_i)) - \Sigma_{i=t-K}^{t} \mathcal{N}(M_{\theta 0}(x_i))\|_2^2 > \eta,$$

where $\eta$ is the predetermined value, and where the number of classes predicted by each of the two models is averaged over the past K samples.

As another example embodiment, which may be referred to as distance reset, the reset module 316 may determine first weights of a final layer of a decoder of the trained semantic segmentation model 304 and second weights of a final layer of the (same) decoder of the adapted semantic segmentation model 308. The reset module 316 may determine differences (subtraction) between the first and second weights (e.g., magnitudes), respectively. The reset module 316 may add the differences to determine a total difference and reset the parameters of the adapted semantic segmentation model 308 when the total difference is greater than a predetermined value. The predetermined value may be calibrated and may be, for example, 50, 100, or another suitable number, such as to prevent over adaptation of the adapted semantic segmentation model 308 away from the training dataset. In various implementations, the reset module 316 may select a greatest (largest magnitude) difference among different sets of parameters that define the decoders of the models 304 and 308 and reset the parameters of the adapted semantic segmentation model 308 when the magnitude of the greatest difference is greater than a predetermined value, such as 3, 4, 5, or another suitable number, such as to prevent over adaptation of the adapted semantic segmentation model 308 away from the training dataset. While the example of the weights of the final layer of the decoder is provided, the present application is also applicable to other weights of the decoder and other weights of other portions of the models.

In this example, the parameters of the adapted semantic segmentation model 308 should not be too different than those of the trained semantic segmentation model 304 at any time t. The weights of the final layer of the decoders can be represented by a tensor $$\mathcal{W} \in \mathbb{R}^{2048 \times 3 \times 3 \times},$$

where C is the number of categories or classes used to train the trained semantic segmentation model 304. C may be 19, less than 19, or more than 19 in various implementations. The tensor W can be divided by the reset module 316 into C slices $\mathcal{W}^C \in \mathbb{R}^{2048 \times 3 \times 3}$, c=0, ..., C−1, and the distance between each tensor slice is determined $\mathcal{L}_c = \|\mathcal{W}_o^C - \mathcal{W}_t^C\|$. The predetermined value and reset strategy can be described by $$\max_c \{\mathcal{L}_c = \|\mathcal{W}_o^C - \mathcal{W}_t^C\|\} > \gamma,$$

where $\gamma$ is the predetermined value.

In yet another example embodiment, which may be referred to as an oracle reset, may involve the reset module 316 determining a performance (e.g., mean interest over union (M-IoU)) of the trained semantic segmentation model 304 and the adapted semantic segmentation model 308. The reset module 316 may reset the parameters of the adapted semantic segmentation model 308 when the performance of the trained semantic segmentation model 304 is greater than the performance of the adapted semantic segmentation model 308 by at least a predetermined amount. The predetermined amount may be zero or greater than zero.

Figure 4:
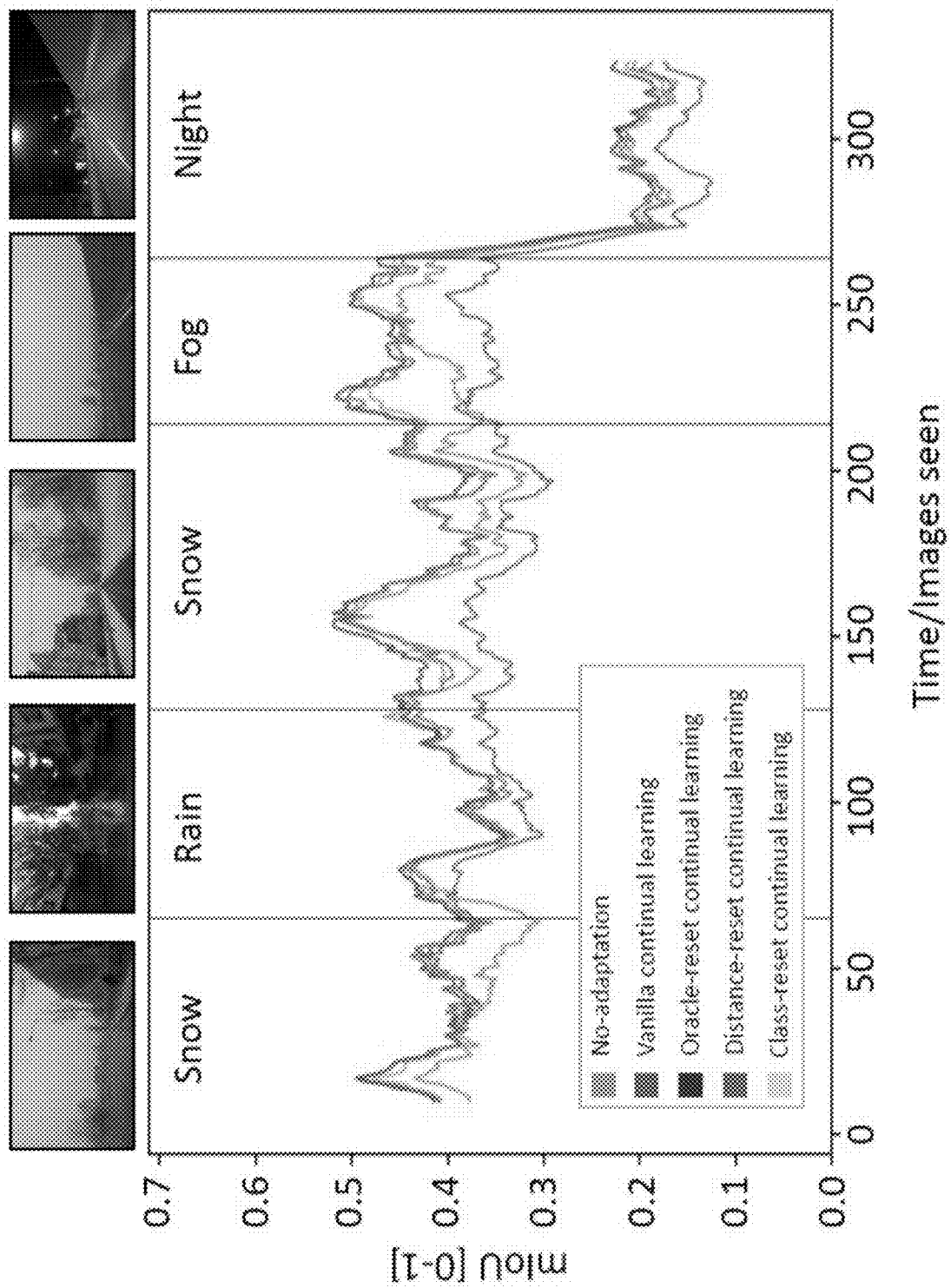
FIGS. 4 and 5 are graphs of performance of different models over time and changes in scenery.
Figure 5:
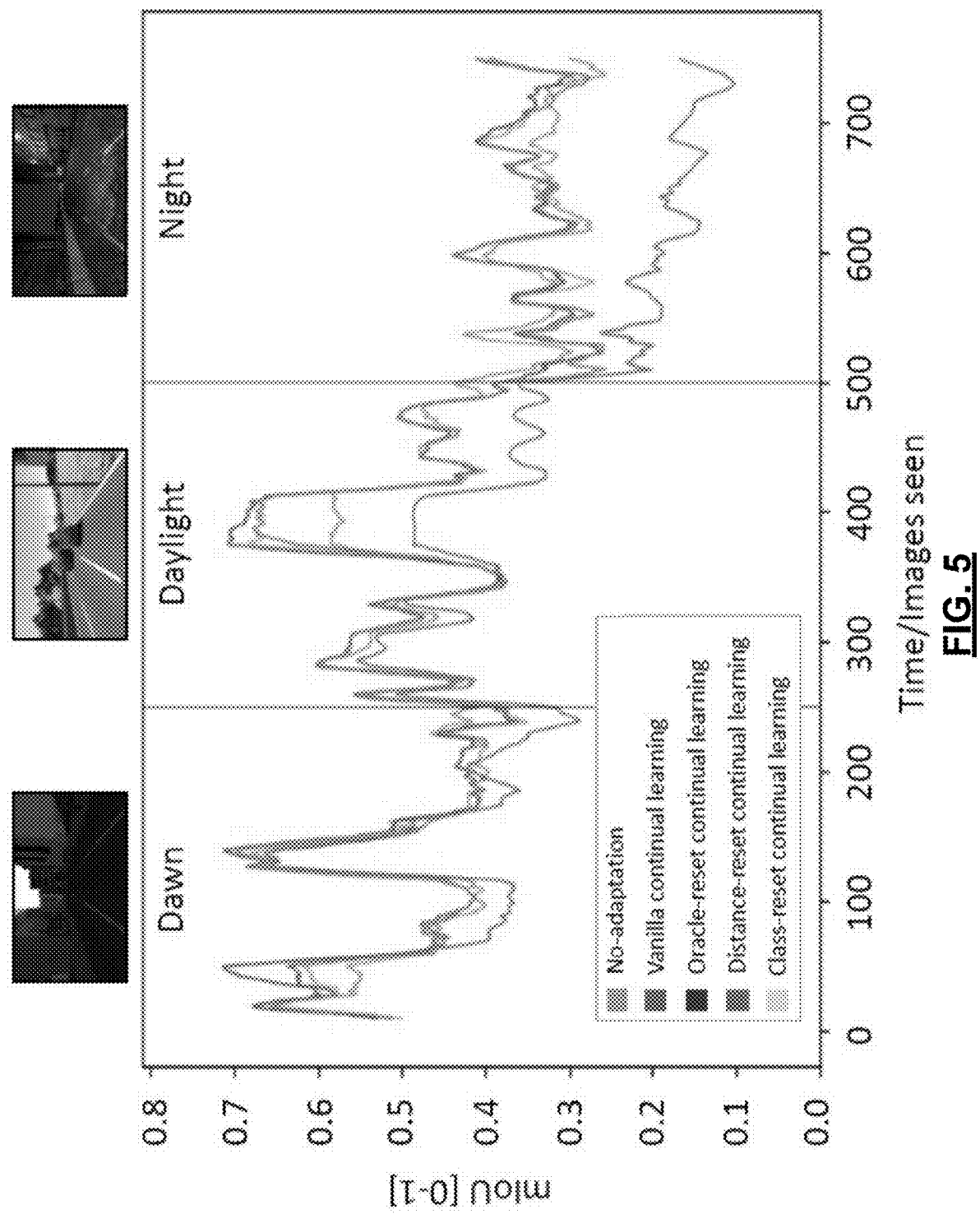

FIGS. 4 and 5 include example graphs of performance of the adapted semantic segmentation model 308 without resetting (vanilla), without adaptation (no-adaptation) and with the example resetting described above. As illustrated, the resetting described herein improves the performance of the adapted semantic segmentation model 308.

Regarding the previous (i.e., intermediate) parameters, the reset module 316 may store the present parameters of the adapted semantic segmentation model 308 in the memory 320 as a parameter checkpoint each time before resetting the parameters of the adapted semantic segmentation model 308. In addition, parameter checkpoints may be stored in memory 320 prior to resetting the parameters of the adapted semantic segmentation model 308 based on a detected environmental change (e.g., a change in one of the following beyond a defined threshold: position, time, temperature, etc.). The detected environmental change may be stored with each parameter checkpoint stored in memory 320.

The reset module 316 may select one of the sets of stored parameters (i.e., parameter checkpoints), for example, based on segmentation maps from the models 304 and 308 associated with different sets of stored parameters. While this example is provided, the selection of a set of stored parameters may be based on one or more other parameters. For example, the reset module 316 may select a stored checkpoint in whole or in part based an environmental change detected by sensors 128.

Figure 6:
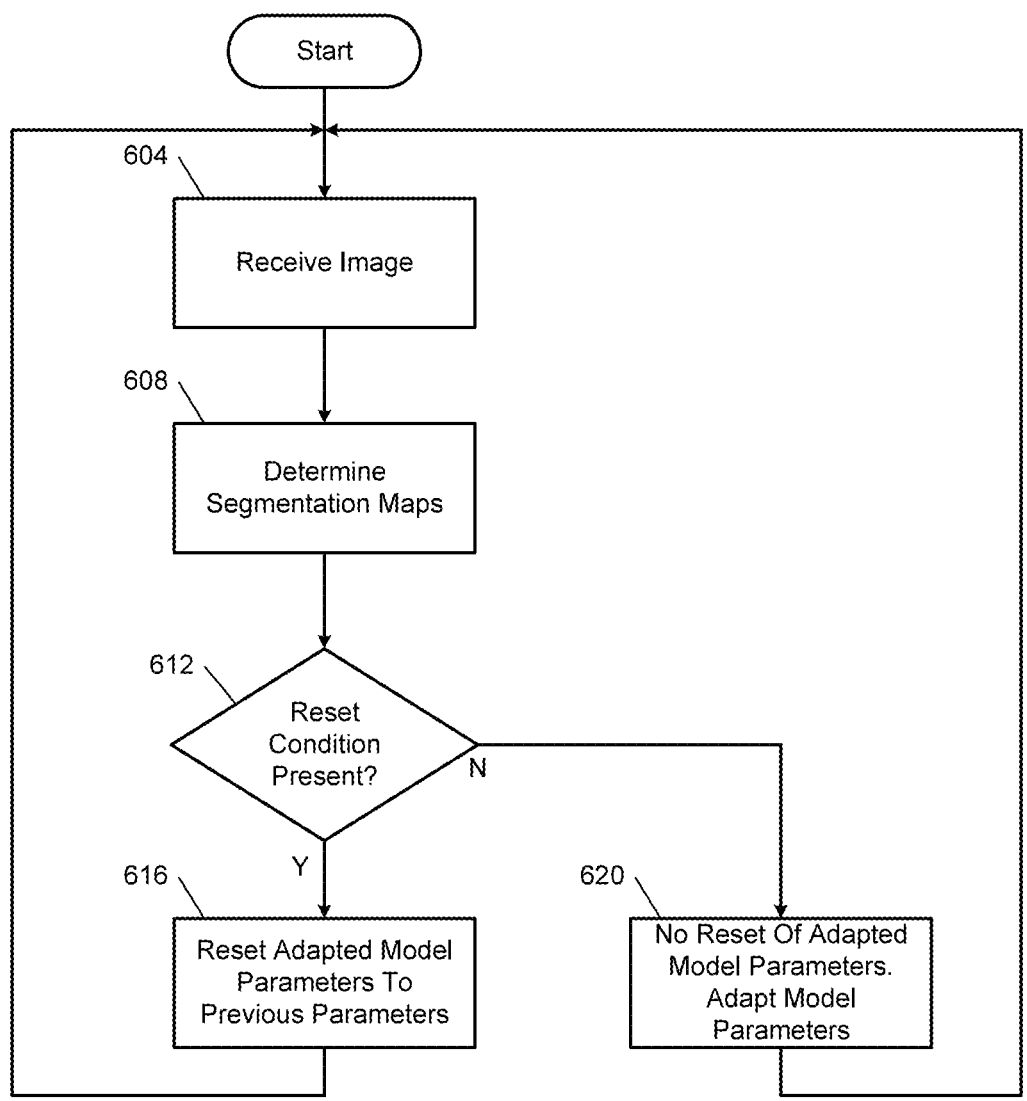
FIG. 6 is a flowchart depicting an example method of adapting and resetting a semantic segmentation model.

FIG. 6 is a flowchart depicting an example method of adapting and resetting a semantic segmentation model. Control begins with 604 where the trained and adapted semantic segmentation models 304 and 308 receive an image from a camera of the robot.

At 608, the trained and adapted semantic segmentation models 304 and 308 generate segmentation maps, respectively, based on the image. At 612, the reset module 316 determines whether a predetermined reset condition is satisfied. For example, the reset module 316 may determine whether the difference between the total numbers of classes in the segmentation maps is greater than the predetermined value. Additionally or alternatively, the reset module 316 may determine whether one or more of the differences between the weights of the final layers of the decoders of the trained and adapted semantic segmentation models 304 and 308 is greater than the predetermined value. Further, additionally or alternatively, the reset module 316 may dynamically detect a change, such as an environmental change by sensors 128 (e.g., a perceived change in location (inside or outside of a building), a perceived change in weather, a perceived change in lighting) that may be used to select categories of classes in the segmentation maps. If 612 is true, control continues with 616. If 612 is false, control may transfer to 620.

At 616, the reset module 316 resets the parameters of the adapted semantic segmentation model 308 to a parameter checkpoint stored in memory 320 that is one of (a) the parameters of the trained semantic segmentation model 304 and (b) a set of the previous parameters 320 of the adapted semantic segmentation model 308. In addition the decision by the reset module 316 for selecting a parameter checkpoint stored in memory 320 may be based in whole or in part on one or more environmental changes detected by sensors 128 and the environmental changes recorded with a parameter checkpoint stored in memory 320.

At 620, the reset module 316 does not reset the parameters of the adapted semantic segmentation model 308. However, the adaptation module 312 may selectively adjust one or more of the parameters of the adapted semantic segmentation model 308. Control returns to 604 for a next image.

While the example of semantic segmentation models is discussed herein, the present application is also applicable to other types of tasks, such as object detection, instance segmentation, and other tasks.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An autonomous system, comprising:
    a first semantic segmentation model trained based on a training dataset including images and labels for the images, the first semantic segmentation model configured to generate a first segmentation map based on an image from a camera of the autonomous system;
    a second semantic segmentation model of the same type of semantic segmentation model as the first semantic segmentation model, the second semantic segmentation model configured to generate a second segmentation map based on the image from the camera of the autonomous system;
    an adaptation module configured to selectively adjust one or more first parameters of the second semantic segmentation model; and
    a reset module configured to:
        determine a first total number of unique classifications included in the first segmentation map;
        determine a second total number of unique classifications included in the second segmentation map; and
        selectively reset the first parameters of the second semantic segmentation model to previous parameters, respectively, based on the first and second total numbers of unique classifications.

2. The autonomous system of claim 1 wherein the reset module is configured to reset the first parameters of the second semantic segmentation model to the previous parameters, respectively, when a difference between the first and second total numbers of unique classifications is greater than a predetermined value.

3. The autonomous system of claim 1 wherein the first parameters of the second semantic segmentation model are initialized to second parameters of the first semantic segmentation model, respectively.

4. The autonomous system of claim 1 wherein the previous parameters are second parameters of the first semantic segmentation model, respectively.

5. The autonomous system of claim 4 wherein the second parameters of the first semantic segmentation model are not changed after the training.

6. The autonomous system of claim 1 wherein the adaptation module is configured to selectively adjust one or more of the first parameters of the second semantic segmentation model based on at least one of: (a) the image and (b) the second segmentation map.

7. The autonomous system of claim 1 wherein the first and second semantic segmentation models each include a DeepLab model.

8. The autonomous system of claim 1 wherein the reset module is further configured to:
   determine first weights of a portion of the first semantic segmentation model;
   determine second weights of the portion of the second semantic segmentation model; and
   selectively reset the first parameters of the second semantic segmentation model to the previous parameters, respectively, based on a comparison of one of the first weights with a respective one of the second weights.

9. The autonomous system of claim 8 wherein the reset module is configured to reset the first parameters of the second semantic segmentation model to the previous parameters, respectively, when a difference between (a) the one of the first weights and (b) the respective one of the second weights is greater than a predetermined value.

10. The autonomous system of claim 8 wherein the portion of the first and second semantic segmentation models is a final layer of a decoder of the first and second semantic segmentation models.

11. The autonomous system of claim 1 wherein the previous parameters include previous parameters, respectively, of the second semantic segmentation model.

12. The autonomous system of claim 1 further comprising a control module configured to selectively actuate an actuator of the autonomous system based on the second segmentation map.

13. An autonomous system, comprising:
   a first semantic segmentation model trained based on a training dataset including images and labels for the images, the first semantic segmentation model configured to generate a first segmentation map based on an image from a camera of the autonomous system;
   a second semantic segmentation model of the same type of semantic segmentation model as the first semantic segmentation model, the second semantic segmentation model configured to generate a second segmentation map based on the image from the camera of the autonomous system;
   an adaptation module configured to selectively adjust one or more first parameters of the second semantic segmentation model; and
   a reset module configured to:
      determine first weights of a portion of the first semantic segmentation model;
      determine second weights of the portion of the second semantic segmentation model; and
      selectively reset the first parameters of the second semantic segmentation model to previous parameters, respectively, based on a comparison of one of the first weights with a respective one of the second weights.

14. The autonomous system of claim 13 wherein the reset module is configured to reset the first parameters of the second semantic segmentation model to the previous parameters, respectively, when a difference between (a) the one of the first weights and (b) the respective one of the second weights is greater than a predetermined value.

15. The autonomous system of claim 13 wherein the previous parameters include previous parameters, respectively, of the second semantic segmentation model.

16. The autonomous system of claim 13 wherein the first parameters of the second semantic segmentation model are initialized to second parameters of the first semantic segmentation model, respectively.

17. The autonomous system of claim 13 wherein the previous parameters are second parameters of the first semantic segmentation model, respectively.

18. The autonomous system of claim 13 wherein the adaptation module is configured to selectively adjust one or more of the first parameters of the second semantic segmentation model based on at least one of: (a) the image and (b) the second segmentation map.

19. The autonomous system of claim 13 further comprising a control module configured to selectively actuate an actuator of the autonomous system based on the second segmentation map.

20. An autonomous system, comprising:
   a first model trained based on a training dataset including images and labels for the images, the first model configured to generate a first output based on an image from a camera of the autonomous system;
   a second model of the same type of model as the first model, the second model configured to generate a second output based on the image from the camera of the autonomous system;
   an adaptation module configured to selectively adjust one or more first parameters of the second model; and
   a reset module configured to:
      determine first weights of a portion of the first model;
      determine second weights of the portion of the second model; and
      selectively reset the first parameters of the second model to previous parameters, respectively, based on a comparison of one of the first weights with a respective one of the second weights.

21. An autonomous system, comprising:
   a camera configured to record input images;
   a sensor module configured to detect one or more environmental changes external to the autonomous system;
   a segmentation module configured to receive the input images from the camera and to segment objects in the input images using a neural network model;
   an adaptation module configured to selectively adjust one or more parameters of the neural network model utilized by the segmentation module from an input set of parameters to define an adapted set of parameters; the input set of parameters being defined by an initial set or parameters or a previously adapted set of parameters; the initial set of parameters of the neural network model being trained on a dataset including images and labels for the images;
   memory configured to store a plurality of parameter checkpoints of the neural network model; the initial set of parameters and each adapted set of parameters stored in the memory defining a different parameter checkpoint; each parameter checkpoint being associated with a different set of parameters of a semantic segmentation model; and
   a reset module configured to selectively reset the neural network model utilized to a parameter checkpoint stored in the memory when the reset module detects the parameters of the neural network model selectively adjusted by the adaptation module to be utilized by the segmentation module exceed a criteria dynamically determined by the reset module.

22. The autonomous system of claim 21, wherein the criteria determined by the reset module is based on in whole or in part on one or more environmental changes detected by the sensor module.

23. The autonomous system of claim 22, wherein the parameter checkpoint selected by the reset module to replace the neural network model selectively adjusted by the adaptation module is determined based in whole or in part on the one or more environmental changes detected by the environment sensor.

24. The autonomous system of claim 23, wherein the sensor module includes one or more of a location sensor, a temperature sensor, a water sensor and a light sensor.

* * * * *